United States Patent [19]
Iglehart et al.

[11] Patent Number: 6,058,167
[45] Date of Patent: May 2, 2000

[54] APPARATUS AND METHOD TO PROVIDE A FUNCTIONAL AND MORE USER-FRIENDLY INTERFACE FOR DOWNLOADED ISDN TELEPHONY FEATURES

[75] Inventors: David Iglehart; Leland Lester, both of Austin; Elie Antoun Jreij, Pflugerville; O. J. Vander Meiden; Kevin M. Raper, both of Austin; James Umstetter, Round Rock, all of Tex.

[73] Assignee: Siemens Information and Communication Networks, Inc., Boca Raton, Fla.

[21] Appl. No.: 08/731,656

[22] Filed: Oct. 17, 1996

[51] Int. Cl.[7] .............................. H04M 11/00; H04M 3/42
[52] U.S. Cl. ........................ 379/93.17; 379/201; 379/915
[58] Field of Search .............................. 379/93.14–93.15, 379/93.17, 93.21, 93.29, 354, 357, 387, 201, 457, 914–916; 345/172, 173; 341/22

[56] References Cited

U.S. PATENT DOCUMENTS

| | | | |
|---|---|---|---|
| 4,788,720 | 11/1988 | Brennan et al. | 379/201 |
| 4,897,866 | 1/1990 | Majmudar et al. | 379/93.14 |
| 5,235,635 | 8/1993 | Gulick | 379/368 |
| 5,337,351 | 8/1994 | Manabe et al. | 379/201 |
| 5,377,261 | 12/1994 | Baals et al. | 379/93.17 |
| 5,386,460 | 1/1995 | Boakes et al. | 345/172 |
| 5,485,511 | 1/1996 | Iglehart et al. | 379/201 |
| 5,488,650 | 1/1996 | Greco et al. | 379/201 |
| 5,544,236 | 8/1996 | Audruska et al. | 379/93.17 |
| 5,745,553 | 4/1998 | Mirville et al. | 379/201 |

*Primary Examiner*—Curtis A. Kuntz
*Assistant Examiner*—George Eng

[57] ABSTRACT

A telephone for use in ISDN telephone systems that implement advanced features such as call forwarding and a method for operating an ISDN telephone system to provide such advanced features are provided for. In an ISDN telephone system implementing the invention, the telephone communicates commands to the switching system by sending codes to the switching system. These codes normally denote keys on the telephone that have been depressed by a user of the telephone. A user of the advanced telephone features having a conventional telephone signals the switching system to activate the advanced telephone feature by depressing a specific key on the conventional telephone. In a system according to the present invention, a code having a value greater than any key code in any telephone in the telephone system is defined and an advanced telephone feature is assigned to that code thereby causing the switching system to implement that advanced feature when the switching system receives that code from a telephone over the network. A telephone according to the present invention includes a menu system that allows the user to select the advanced features implemented by the telephone system. The controller also includes a communication program that causes the switching system to download a list of advanced features implemented by the switching system, and the controller creates a menu item corresponding to each advanced feature identified in the list. In one embodiment of the present invention, the controller implements programs that simplify the use of the advanced features.

8 Claims, 2 Drawing Sheets

6,058,167

APPARATUS AND METHOD TO PROVIDE A FUNCTIONAL AND MORE USER-FRIENDLY INTERFACE FOR DOWNLOADED ISDN TELEPHONY FEATURES

FIELD OF THE INVENTION

The present invention relates to telephones, and more particularly, to an improved telephone for implementing advanced voice features in an ISDN network.

BACKGROUND OF THE INVENTION

Single integrated services digital network (ISDN) lines provide an intermediate solution for users in need of digital services having a capacity greater than that of conventional telephone subscriber lines, but less than that of a T1 connection. A single basic rate interface line (BRI line) has two B-channels. Each B-channel is capable of supporting a voice connection with advanced features such as conference calling. Other examples of advanced features are call forwarding, call transfer, auto callback, and privacy. Auto callback causes the switch to call a party back if the first attempt to call the party indicated that the called party's line was busy. The second call is placed as soon as the switch determines that the called party's line is now free. "Privacy" is a feature utilized in EKTS systems to prevent other members of an EKTS group from listening to a call placed by one of the members. The specific features available on any ISDN line vary depending on the switching system.

ISDN networks are configured under the assumption that the phone is "dumb" with respect to the implementation of the advanced features. The phone is assumed to contain only the intelligence necessary to report key strokes to the central office switch, lights LEDs on the handset, and display messages on an LCD or similar display. The available keys on the phone are numbered. When a key is depressed, the key number is sent to the switch.

The advanced features are implemented by assigning features to specific keys. The specific key assignments vary from switch to switch. In addition, any particular switch may implement several different telephone configurations corresponding to the various phone models that were anticipated when the switch was programmed. When a user subscribes to an ISDN service, a set is chosen depending on his or her equipment. In the current implementation, the user must ask the telephone company for the Feature Identification Number value for each feature, i.e., key number, and note that information on the telephone.

In principle, the telecommunications switch manufacturers and/or telephone companies could standardize the keys used for advanced features. However, the existing installed base of non-standard ISDN telephones makes such standardization difficult.

There are a limited number of keys on the telephone. In addition to implementing the advanced features, these keys are also used for speed dialing and other local features such as mute, speaker, etc. Currently available ISDN telephones do not provide any means for moving the advanced features so that the user can arrange his or her speed dialing or other local keys in a manner that is more optimum for the user.

Another problem with prior art ISDN telephone advanced features is the number of key strokes needed to exercise some of the features. For example, to set up a conference call, the user must typically perform 6 actions. First, the user dials the first party. Second, the user presses the conference key. Third, the user must wait for a "conference" LED to turn on. Fourth, the user presses another key and waits for a dial tone. Fifth, the user dials the second telephone number. Finally, the user presses yet another key, "retrieve to conference", to complete the connection between the user and the two external parties to the call. In principle, the user needs only dial the two telephone numbers and press one key to set up a conference call; hence, this procedure is obviously much more cumbersome than it needs to be.

Broadly, it is the object of the present invention to provide an improved ISDN phone.

It is a further object of the present invention to provide a method and telephone that allows all switches to implement a standard set of keys for the ISDN advanced features.

It is yet another object of the present invention to provide a method and telephone that does not require the user to identify the keys to be used for the advanced features.

It is a still further object of the present invention to provide a telephone that reduces the number of key strokes needed to utilize the advanced features.

It is yet another object of the present invention to provide a telephone that allows the user to customize the keys.

These and other objects of the present invention will become apparent to those skilled in the art from the following detailed description of the invention and the accompanying drawings.

SUMMARY OF THE INVENTION

The present invention is a telephone for use in ISDN telephone systems that implement advanced features such as call conferencing and a method for operating an ISDN telephone system to provide such advanced features. In an ISDN telephone system according to the present invention, a telephone communicates with a switching system attached thereto via a telephone network. The telephone communicates commands to the switching system by sending codes to the switching system; these codes normally denote keys on the telephone that have been depressed by a user of the telephone. A user of the advanced telephone features having a conventional telephone signals the switching system to activate the advanced telephone feature by depressing a specific key on the conventional telephone. In a system according to the present invention, a code having a value greater than any key code in any telephone in the telephone system is defined, and an advanced telephone feature is assigned to that code thereby causing the switching system to implement that advanced feature when the switching system receives that code from a telephone over the network. A telephone according to the present invention includes a conventional keypad having a plurality of keys, each key generating a code upon being depressed by a user of the ISDN telephone, the codes being sent on a telephone line connected to the telephone. In addition, a telephone according to the present invention includes a controller including a memory for storing a plurality of codes, at least one of the codes corresponding to an advanced feature to be activated by a switching system connected to the telephone. The code corresponding to the advanced feature has a value higher than any code sent in response to one of the switches being depressed. A telephone according to the present invention also includes a display for displaying a menu and for receiving input from the user identifying one of the items in the menu. One item on the menu corresponds to the advanced feature. The code corresponding to the advanced feature is sent to the switching system in response to the user identifying that item. In one embodiment of the present invention, the controller also includes a communication program that causes the switching system to download a list of advanced features implemented by the switching system, and the controller creates a menu item corresponding to each advanced feature identified in the list. In another embodiment of the present invention, the controller implements programs that simplify the use of the advanced features.

DETAILED DESCRIPTION OF THE INVENTION

Figure 1:
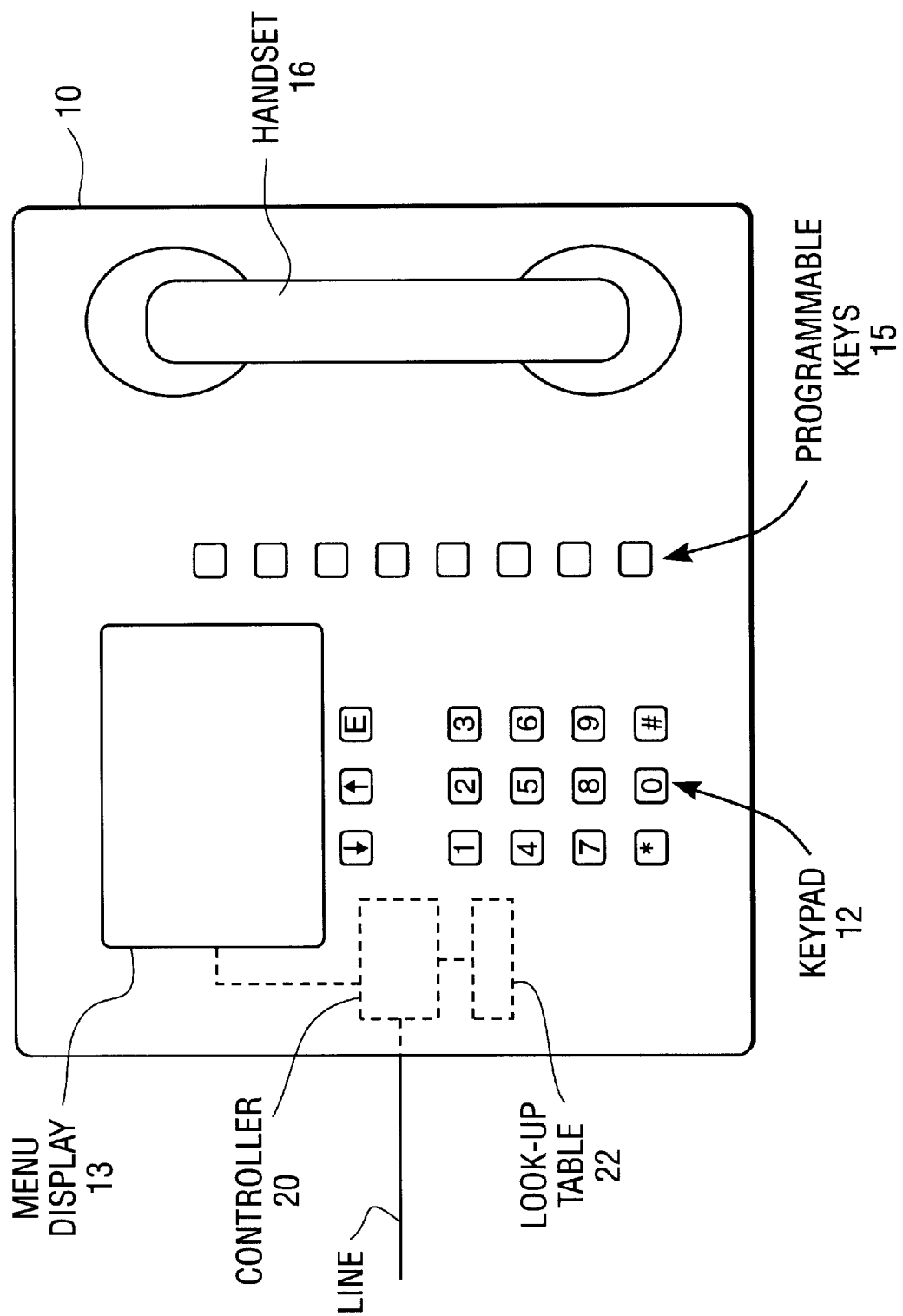
FIG. 1 illustrates an ISDN telephone according to the present invention.
Figure 2:
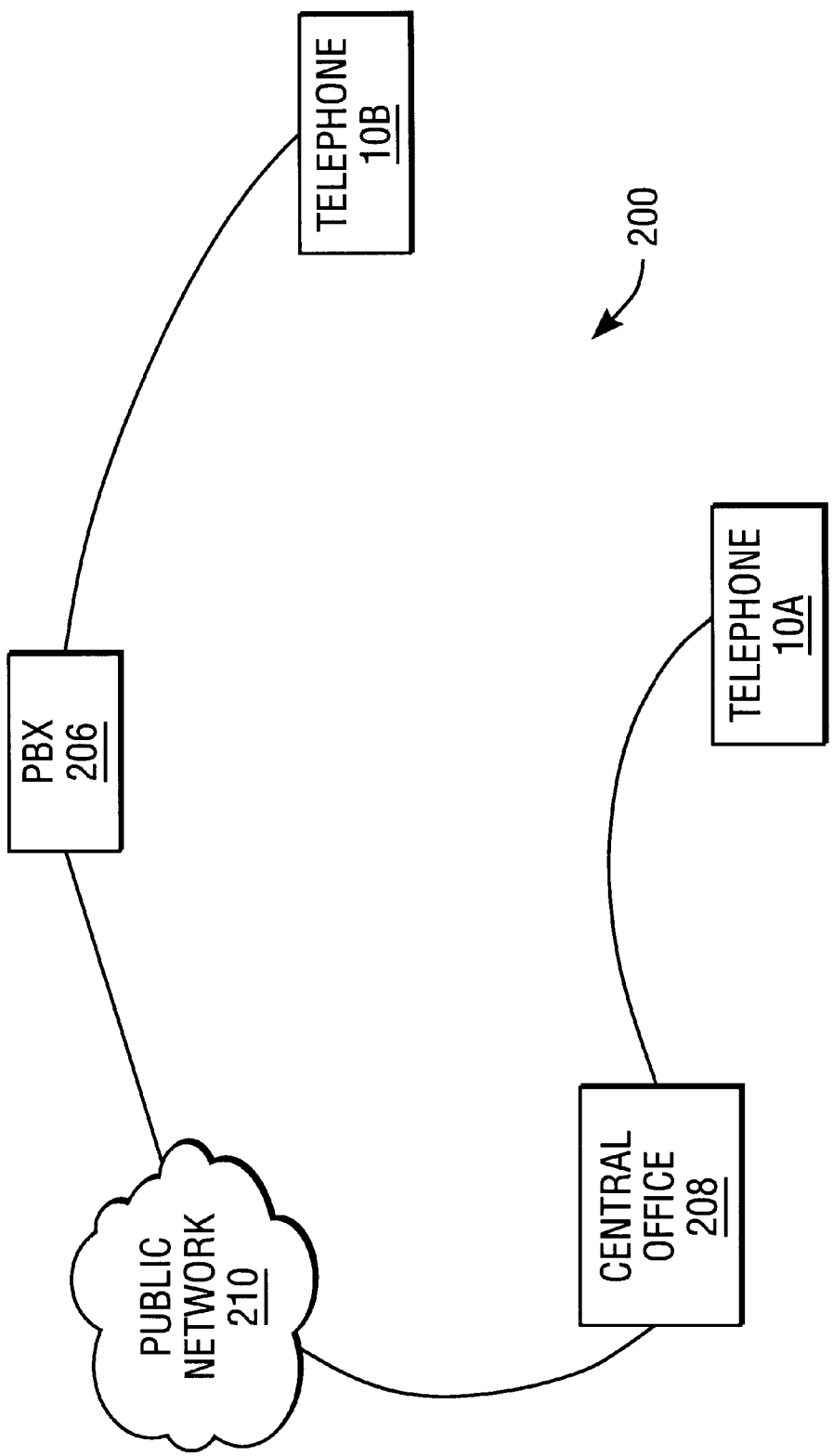
FIG. 2 illustrates a system for use with the telephone of FIG. 1.

Refer to FIG. 1, which illustrates an ISDN telephone 10 according to the present invention. Telephone 10 includes a conventional keypad 12 and handset 16. The present invention may be viewed as a telephone having a plurality of "virtual" keys. A user "presses" a virtual key by selecting a function from a menu on a display 13. The telephone includes a microprocessor-based controller 20 which sends one or more Feature Identification Numbers (FINs) to the switch (shown in FIG. 2) in response to the user's selection. From the switching system's point of view, these FINs are no different from the FINs sent in response to the user pressing conventional keys on the telephone. Controller 20 performs the various communication and programming functions described herein. It is to be understood that controller 20 is connected to the various keys even though such connections are not explicitly shown in FIG. 1. A telephone according to the present invention may also include one or more programmable keys shown at 15. These keys provide speed dialing and other functions (mute, auto-answer, hold, etc.). Additional programmable keys may be provided by the menu display. FIG 2 shows a system 200 including telephones 10A and 10B connected to public network 210 via a central office 208 and a PBX 206, respectively. Each telephone preferably controller, as shown in FIG. 1, although the controller can be a device added to an existing telephone.

The virtual keys are outside the physical key range of the physical keys on the telephone. For example, if the maximum number of physical keys supported by the telephone is 44, the first virtual key will be assigned a FIN greater than 44. The FINs are preferably greater than those for any existing telephone. The telephone company usually maintains feature tables for all types of telephones and subscriber options. These tables will indicate these virtual keys as if the keys were physical keys on the telephones. Since the virtual keys correspond to keys that are not now in use on any telephone, this set of key of assignments can be standardized across the industry without interfering with existing ISDN telephones.

It should be noted that current ISDN switches will "download" a list of the advanced features available and the keys to which they are assigned in response to a configuration command. The information is in the form of a list in which each entry consists of an FIN and a short text message describing the feature corresponding to that FIN. This information is the same as provided by the telephone company to the user as described above. Unfortunately, in the current mode, this information cannot be read by the user unless the user has a telephone that can display the information. Furthermore, the telephone cannot easily and reliably parse the text information to configure itself, since the text messages are not standardized across different switches. For example, the text message corresponding to conference call may be "conference" on one switch and "3-way calling" on another switch.

With the present invention, the telephone can determine if conference calling is provided by looking for the standard FIN for the conference call advanced feature in the downloaded information. If the FIN for a feature is present in the download, the telephone knows that this feature is available, and provides the corresponding entry on the menu display. If the FIN is missing, the telephone knows that either the feature is not available or the switch does not implement the standard ISDN advanced feature FIN set. The case in which the switch does not implement the standard ISDN advanced feature set can be handled by including one FIN in the feature set that is always assigned. If controller 20 determines that a feature is not present, the corresponding menu item is not displayed.

If the switch does not implement the standard advanced feature FIN set, an ISDN telephone according to one embodiment of the present invention may be programmed to utilize the advanced feature set that is implemented by using the download information. In the preferred embodiment of the present invention, the controller maintains a translation table 22 for assigning the key definitions utilized by the switch to the key definitions utilized on the telephone. In operation, each time a key is depressed on the telephone or an item is selected from the menu, controller 20 looks up the corresponding code in the translation table and sends the table value from the table to the switch.

In the case in which the standard advanced feature set is implemented, the entries in this table are the same, since the telephone and the switch are using the same FIN assignments. In the case in which the switch is using a non-standard assignment, the table is used to map the standard feature set to the non-standard set used by the switch. For example, if the standard feature set assigns FIN 64 to call forwarding, the table will normally have a switch FIN value of 64 corresponding to virtual telephone key 64 which appears on the menu as "call forwarding". If the non-standard switch assigns an FIN of 14 for call forwarding, then the switch FIN value corresponding to key 64 is changed to 14.

The programming of the translation table may be done by controller 20 with or without the aid of the user. The controller will download the advanced feature assignments from the switch as described above in either case. If the controller can parse the message, it will make the corresponding entries in the translation table. If the controller cannot parse the text, the controller can display the text to the user and ask the user to pick the function from the list of standard advanced features.

In addition to providing a means for standardizing the implementation of the advanced features on ISDN telephones, the present invention may also be utilized to simplify the manner in which the user interacts with the telephone. As noted above, some of the advanced features require more than one key stroke to implement. Controller 20 may be used to reprogram these functions so that the user is asked to input only the desired feature and the minimum number of key strokes to implement that feature. Controller 20 then translates this information into the sequence of key strokes expected by the switch.

For example, conference calling can be implemented as follows: The user first dials and connects to the first party. The user then selects conference call from the menu, and controller 20 sends the conference call FIN to the switch, waits for the conference light signal to be received, selects the other line, and provides the user with a dial tone. The user dials the second party. Controller 20 may prompt the user to dial the second party using the menu display window. After connecting to the second party, the user selects "complete conference" from the menu. The controller translates this "key" to the "retrieve to conference" described above.

Various modifications to the present invention will become apparent to those skilled in the art from the foregoing description and accompanying drawings. Accordingly, the present invention is to be limited solely by the scope of the following claims.

What is claimed is:

1. In a method for operating an ISDN telephone system including a set of telephones that communicate with a switching system via a telephone network using a first set of codes, said codes normally denoting keys that have been pressed by a telephone user, said tone system implementing a set of advanced telephone features, a user signaling said switching system to activate one of said advanced telephone features by pressing a specific key on a telephone in said set, the improvement comprising:

defining a second set of codes at the switching system, each code in said second set having a value greater than all codes in said first set; and assigning said one of said advanced telephone features to one of said defined codes thereby causing said switching system to implement said advanced feature when said switching system receives said one of said defined codes from a telephone over said network.

2. A method of claim 1 in which a table is used to map one code from said first Set of codes to one code from said second set, said code from said second set being forwarded to said switch to implement said feature.

3. An ISDN telephone comprising:

a plurality of keys, each of said keys generating a code from a first set of codes upon being pressed by a user of said ISDN telephone, said code from first set identifying the key from which it was generated, said code from said first set being sent on a telephone line connected to said telephone, at least one code from said first set of codes activating an advanced feature; and a controller including a mean for receiving a second set of codes at a switching system connected to said telephone and a memory for storing said second set of codes, at least one of said codes in said second set corresponding to said advanced feature to be activated by the switching system, said code in said second set corresponding to said advanced feature having a value greater than all codes in said first set; and display means for displaying a menu comprising a plurality of items to a user and for receiving input from said user identifying one of said items, wherein one item on said menu corresponds to said advanced feature and wherein said code in said second set of codes corresponding to said advanced feature is sent to said switching system in response to said user identifying said item.

4. The ISDN telephone of claim 3 wherein said controller further comprises means for causing said switching system to download a set of advanced features implemented by said switching system, and wherein said controller creates said menu item corresponding to each advanced feature identified in said set of advanced features.

5. The ISDN telephone of claim 4 wherein said controller determines if an advanced feature is supported by said switching system by displaying said set of advanced features to a user of said telephone and receiving a response from said user.

6. The ISDN telephone of claim 3 wherein said controller further comprises means for executing a program comprising a plurality of codes from said second set of codes that are sent to said switching system in response to said user selecting one of said items on said menu, at least two of said codes corresponding to a respective one of said advanced features implemented by the switching system.

7. The ISDN telephone of claim 6 wherein one of said advanced features comprises conference calling.

8. The telephone of claim 3 in which said second set of codes includes a code that is display if and only if the controller determines that the switch supports a corresponding advanced feature.

* * * * *